United States Patent
Chan et al.

(10) Patent No.: US 9,329,842 B1
(45) Date of Patent: May 3, 2016

(54) METHOD AND SYSTEM FOR PROVIDING A USER INTERFACE

(71) Applicant: Yahoo! Inc., Sunnyvale, CA (US)

(72) Inventors: Chris Chan, Santa Clara, CA (US); Tony Hairr, Santa Clara, CA (US); Katrina Tempero, San Mateo, CA (US); Yu-Chin Tai, Sunnyvale, CA (US); Wit Tatiyanupanwong, San Jose, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 14/552,695

(22) Filed: Nov. 25, 2014

(51) Int. Cl.
*G06F 9/44* (2006.01)
*G06F 11/36* (2006.01)

(52) U.S. Cl.
CPC .............. *G06F 8/38* (2013.01); *G06F 11/368* (2013.01)

(58) Field of Classification Search
CPC ........................................................ G06F 8/38
See application file for complete search history.

(56) References Cited

U.S. PATENT DOCUMENTS

| | | | | |
|---|---|---|---|---|
| 8,185,608 B1* | 5/2012 | York | ...................... | G06Q 30/02 709/203 |
| 2006/0271856 A1* | 11/2006 | Raymond | .................. | G06F 8/38 715/730 |
| 2007/0006043 A1* | 1/2007 | Pins | ..................... | G06F 11/3692 714/38.14 |
| 2007/0101279 A1* | 5/2007 | Chaudhri | ............... | G06F 3/0481 715/762 |
| 2008/0056143 A1* | 3/2008 | Mathews | ........... | H04M 1/72519 370/250 |
| 2010/0317332 A1* | 12/2010 | Bathiche | ................ | H04L 12/282 455/418 |
| 2012/0290920 A1* | 11/2012 | Crossley | .................... | G06F 8/38 715/234 |
| 2014/0052853 A1* | 2/2014 | Mestres | ............... | H04L 43/0876 709/224 |
| 2014/0067521 A1* | 3/2014 | Kirkby | .................... | G06Q 30/02 705/14.42 |
| 2015/0074543 A1* | 3/2015 | Edwin | ...................... | H04L 67/22 715/745 |
| 2015/0149939 A1* | 5/2015 | Mayblum | ............... | H04M 1/00 715/765 |
| 2015/0205505 A1* | 7/2015 | Conn | ..................... | G06F 3/0481 715/765 |

* cited by examiner

*Primary Examiner* — Philip Wang
(74) *Attorney, Agent, or Firm* — Pillsbury Winthrop Shaw Pittman LLP

(57) ABSTRACT

Method, system, and programs for providing a user interface are disclosed. In one example, a plurality of candidate user interfaces is determined. Each candidate user interface is associated with one or more parameters related to a user interface. Each of the plurality of candidate user interfaces is provided to a subset of users selected from the plurality of users. Inputs are obtained from the plurality of users with respect to each of the plurality of candidate user interfaces. One or more candidate user interfaces are selected from the plurality of candidate user interfaces based on the inputs. A new candidate user interface is generated based on the selected one or more candidate user interfaces. A user interface is identified based on the new candidate user interface and the selected one or more candidate user interfaces. The identified user interface is provided to the plurality of users.

20 Claims, 15 Drawing Sheets

METHOD AND SYSTEM FOR PROVIDING A USER INTERFACE

BACKGROUND

1. Technical Field

The present teaching relates to methods, systems, and programming for Internet services. Particularly, the present teaching is directed to methods, systems, and programming for providing a user interface.

2. Discussion of Technical Background

The advancement in the Internet has made it possible to make a tremendous amount of information accessible to users located anywhere in the world. Effort has been made to design a user interface (UI) to improve user experience on a web page, an application, a device, etc.

Conventional approaches focus on manually testing many variables associated with UI one by one, which is a very tedious process as engineers have to code all different variations of UI. In addition, existing techniques focus only on static UI design without addressing user information, market information, or traffic sources.

Therefore, there is a need to develop techniques to provide a UI to overcome the above drawbacks.

SUMMARY

The present teaching relates to methods, systems, and programming for Internet services. Particularly, the present teaching is directed to methods, systems, and programming for providing a user interface.

In one example, a method, implemented on at least one computing device each of which has at least one processor, storage, and a communication platform connected to a network for providing a user interface to a plurality of users, is disclosed. A plurality of candidate user interfaces is determined. Each candidate user interface is associated with one or more parameters related to a user interface. Each of the plurality of candidate user interfaces is provided to a subset of users selected from the plurality of users. Inputs are obtained from the plurality of users with respect to each of the plurality of candidate user interfaces. One or more candidate user interfaces are selected from the plurality of candidate user interfaces based on the inputs. A new candidate user interface is generated based on the selected one or more candidate user interfaces. A user interface is identified based on the new candidate user interface and the selected one or more candidate user interfaces. The identified user interface is provided to the plurality of users.

In another example, a system having at least one computing device each of which has at least one processor, storage, and a communication platform connected to a network for providing a user interface to a plurality of users, is disclosed. The system comprises a control information analyzer, a version test unit, a user data retriever, a version filter, a version generator, and a user interface updater. The control information analyzer is configured for determining a plurality of candidate user interfaces each of which is associated with one or more parameters related to a user interface. The version test unit is configured for providing each of the plurality of candidate user interfaces to a subset of users selected from the plurality of users. The user data retriever is configured for obtaining inputs from the plurality of users with respect to each of the plurality of candidate user interfaces. The version filter is configured for selecting one or more candidate user interfaces from the plurality of candidate user interfaces based on the inputs. The version generator is configured for generating a new candidate user interface based on the selected one or more candidate user interfaces. The user interface updater is configured for identifying a user interface based on the new candidate user interface and the selected one or more candidate user interfaces and providing the identified user interface to the plurality of users.

Other concepts relate to software for implementing the UI adaptation. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine-readable tangible and non-transitory medium having information for providing a user interface to a plurality of users is disclosed. The information, when read by the machine, causes the machine to perform the following. A plurality of candidate user interfaces is determined. Each candidate user interface is associated with one or more parameters related to a user interface. Each of the plurality of candidate user interfaces is provided to a subset of users selected from the plurality of users. Inputs are obtained from the plurality of users with respect to each of the plurality of candidate user interfaces. One or more candidate user interfaces are selected from the plurality of candidate user interfaces based on the inputs. A new candidate user interface is generated based on the selected one or more candidate user interfaces. A user interface is identified based on the new candidate user interface and the selected one or more candidate user interfaces. The identified user interface is provided to the plurality of users.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
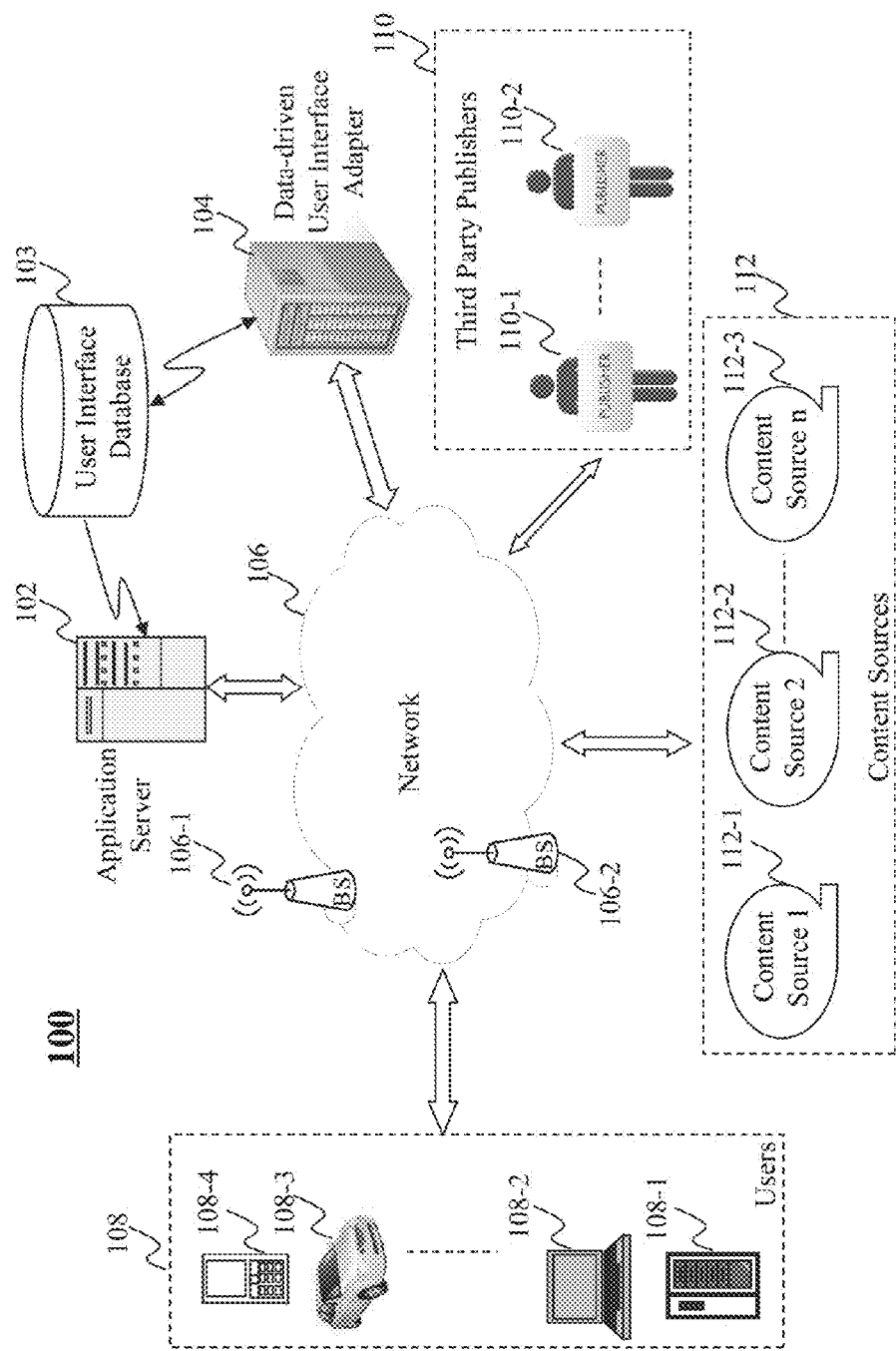
FIG. 1 is a high level depiction of an exemplary networked environment for providing a data driven UI, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and effective UI design. The method and system as disclosed herein aim at automatically adjusting a UI provided by an application server or a publisher, based on dynamic user data. The system may determine a set of UI related variables to be tested such as font size, padding, margin, color, etc. Each variable may have a predetermined range constraint. The system may generate a UI version as a test candidate (referred to as a bucket) with a combination of those variables within those constraints. For example, it may generate an advertisement with 13pt font, 4px padding, 3px margin, and gray color. The system can continue creating test candidates until running out of bucket space. The system may send each test candidate to a different group of users and collect data feedback from the users. Each group of users may represent other groups of users in terms of preference regarding a UI.

The system can consume the data from users in a fitness test to see which buckets performed well, in accordance with various metrics to reflect positive revenue for a publisher and/or good user experience. The metrics may include price per click, click through rate, long dwell time, short dwell time, etc. Buckets that fail to pass the fitness test may be automatically removed. Buckets that performed well may be able to breed with other high performance buckets to create new children buckets. The children buckets can inherit features from their parent buckets, by a recombination of parameters from the parent buckets. Additional children buckets can evolve based on mutation or slight variations from their parents. The system may then perform a new round of testing based on the children buckets and surviving buckets that performed well in a previous round. This process automatically repeats itself until a predetermined condition is met.

The automatic UI design and adaptation in present disclosure largely reduces engineering and project management costs for running buckets and hence allows testing more buckets at the same time. The system can enable a data-driven UI design by automatically evaluating which buckets succeeds or fails, stopping bucket tests that are failing, and automatically creating new variations. The ability to automatically generate new variations continually based on user behavior can overcome issues such as advertisement blindness, where a user becomes used to a certain advertisement format and begins to ignore that advertisement space. In addition, if a new UI design is very different from a UI being used, the system can find an optimal evolutionary path to the new UI. For example, the system may make small subtle changes to the UI over time until it finally reaches the new design. This can reduce complaints that users may make because users generally prefer gradual changes to major changes.

The system can also find local optimal user interfaces in international markets as different geographies, cultures, and people have different perception. The system can further find local optimal user interfaces by segmenting user population by e.g. geolocation, gender, device type, device screen size, local weather condition, age group, sentiment analysis of content on the page, etc. The system can also find optimal user interfaces based on traffic source. For example, the system may have widgets on third party publishers. Each third party publisher may yield a different user interface design on its respective web page.

Because the system implements an automatic scheme for UI adaptation, there is no need for a human to memorize or calculate anything. Accordingly, the algorithm in the system is robust even when the project is handed over from one group of workers to another. In practice, a team can run many bucket tests for a product. However, when that team leaves and a new team enters, a lot of domain knowledge is lost. Accordingly, the new team needs to re-run old tests that have been tested a long time ago, just because the new team doesn't have that prior knowledge. The system in present disclosure can solve this issue with an idea that each generation produced has genetic memory. For example, the reason why a generation exists is because other non-optimal solutions had died off, and the strongest survived.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for providing a data driven UI, according to an embodiment of the present teaching. In FIG. 1, the exemplary networked environment 100 includes an application server 102, a user interface database 103, a data-driven user interface adapter 104, one or more users 108, a network 106, content sources 112, and one or more third party publishers 110. The network 106 may be a single network or a combination of different networks. For example, the network 106 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 106 may be an online advertising network or ad network that is a company connecting advertisers to web sites that want to host advertisements. A key function of an ad network is aggregation of ad space supply from publishers and matching it with advertiser demand. The network 106 may also include various network access points, e.g., wired or wireless access points such as base stations or Internet exchange points 106-1 . . . 106-2, through which a data source may connect to the network 106 in order to transmit information via the network 106.

Users 108 may be of different types such as users connected to the network 106 via desktop computers 108-1, laptop computers 108-2, a built-in device in a motor vehicle 108-3, or a mobile device 108-4. A user 108 may send a request to the application server 102 and/or the one or more third party publishers 110 via the network 106 and receive content from the application server 102 and/or the one or more third party publishers 110. The content can be provided with a user interface retrieved from the user interface database 103. The user interface database 103 stores user interfaces designed by the data-driven user interface adapter 104, in accordance with different user information, market information, and/or publisher information.

The data-driven user interface adapter 104 may access and update user interfaces stored in the user interface database 103. In one embodiment, a group of users for a publisher 110-1 may be associated with a default user interface stored in the user interface database 103. The data-driven user interface adapter 104 can automatically modify the default user interface based on dynamic data feedback from the group of users. The modification may include comparing the default user interface with one or more candidate user interfaces, based on user data feedback and a metric related to e.g. revenue for the publisher and/or user experience of the group of users. The modification may also include generating new candidate user interfaces, based on a recombination of parameters from user interfaces that performed well in term of the metric. The modification may also include generating new candidate user interfaces, based on mutation or slight variations from user interfaces that performed well in term of the metric. Details on the automatic modification of user interfaces at the data-driven user interface adapter 104 will be described later.

The data-driven user interface adapter 104 may interact with the third party publishers 110 to design user interfaces for each of them, as different publishers may have different content areas, different target users, and/or different platforms. In one embodiment, the third party publishers 110 may directly use the default user interface designed for the application server 102, without extra modification by the data-driven user interface adapter 104.

The content sources 112 include multiple content sources 112-1, 112-2 . . . 112-3, such as vertical content sources. A content source 112 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The application server 102 may access information from any of the content sources 112-1, 112-2 . . . 112-3.

Figure 2:
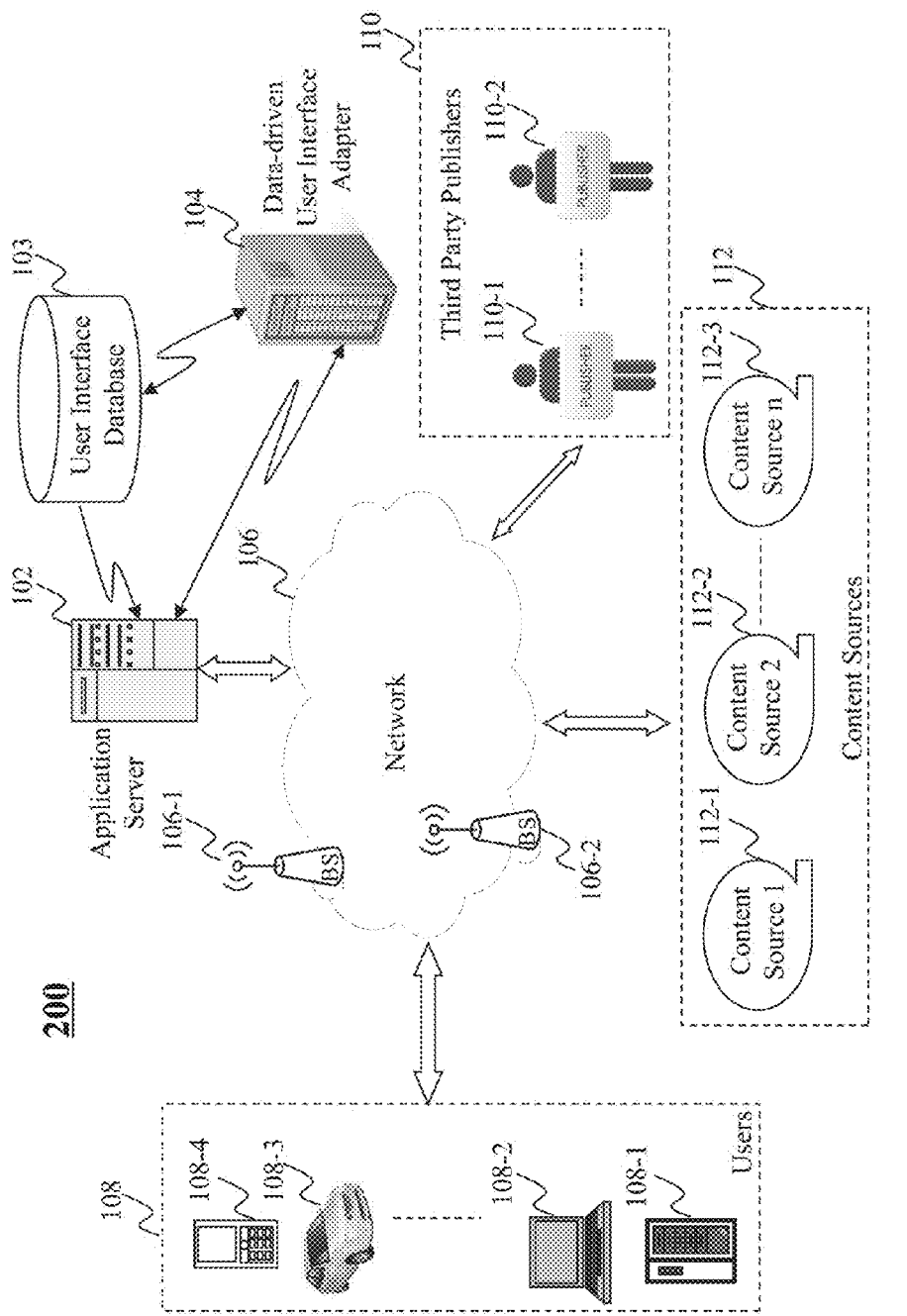
FIG. 2 is a high level depiction of another exemplary networked environment for providing a data driven UI, according to an embodiment of the present teaching.

FIG. 2 is a high level depiction of another exemplary networked environment 200 for providing a data driven UI, according to an embodiment of the present teaching. The exemplary networked environment 200 in this embodiment is similar to the exemplary networked environment 100 in FIG. 1, except that the data-driven user interface adapter 104 serves as a backend system of the application server 102.

Figure 3:
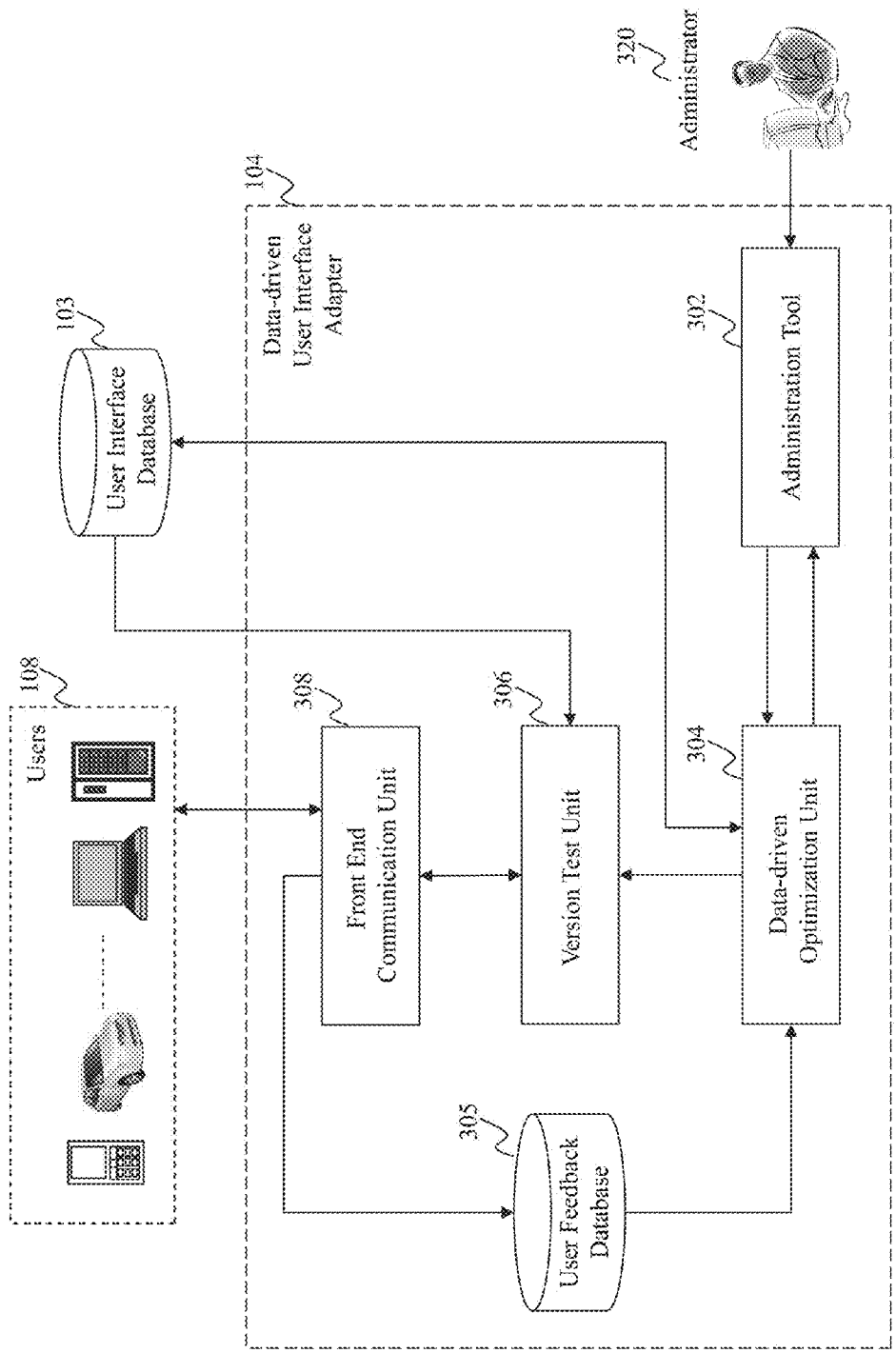
FIG. 3 illustrates an exemplary diagram of a data-driven user interface adapter, according to an embodiment of the present teaching.

FIG. 3 illustrates an exemplary diagram of the data-driven user interface adapter 104, according to an embodiment of the present teaching. The data-driven user interface adapter 104 in this example includes an administrator tool 302, a data-driven optimization unit 304, a version test unit 306, a front end communication unit 308, and a user feedback database 305. A request for designing or updating a UI may come from an administrator, who may be an expert in the area of UI design and/or a manager of a publisher. For example, the administrator may periodically send a request for UI update. The request for designing or updating a UI may also be automatically generated by the data-driven user interface adapter 104 upon receiving updated data from the users 108. For example, after detecting user data from the users 108, the data-driven user interface adapter 104 may determine that user engagement becomes lower and this may due to an outdated UI. Hence, automatic data-driven UI design/update may be triggered at the data-driven user interface adapter 104. This data-driven UI design/update may continue as long as there are user data being received.

The administrator tool 302 in this example obtains administration information from the administrator 320. The administration information may include information about parameters to be tested related to a UI, test ranges for the parameters, and other control information related to test candidate generation. In one embodiment, the administration information may be stored or configured in the administrator tool 302, without an involvement of the 320. The administrator tool 302 may send the administration information to the data-driven optimization unit 304 for test candidate generation.

The data-driven optimization unit 304 in this example receives and analyzes the administration information from the administrator tool 302, to determine parameters to be tested for a UI design or update and determine test ranges for the parameters. Based on the parameters and the test ranges, the data-driven optimization unit 304 may generate various UI versions as test candidates or buckets. In present disclosure, "test candidate", "UI candidate", "UI bucket" and "bucket" will be used interchangeably to mean a candidate UI to be tested in an A/B testing, a multivariate testing, or a bucket testing.

Figure 5:
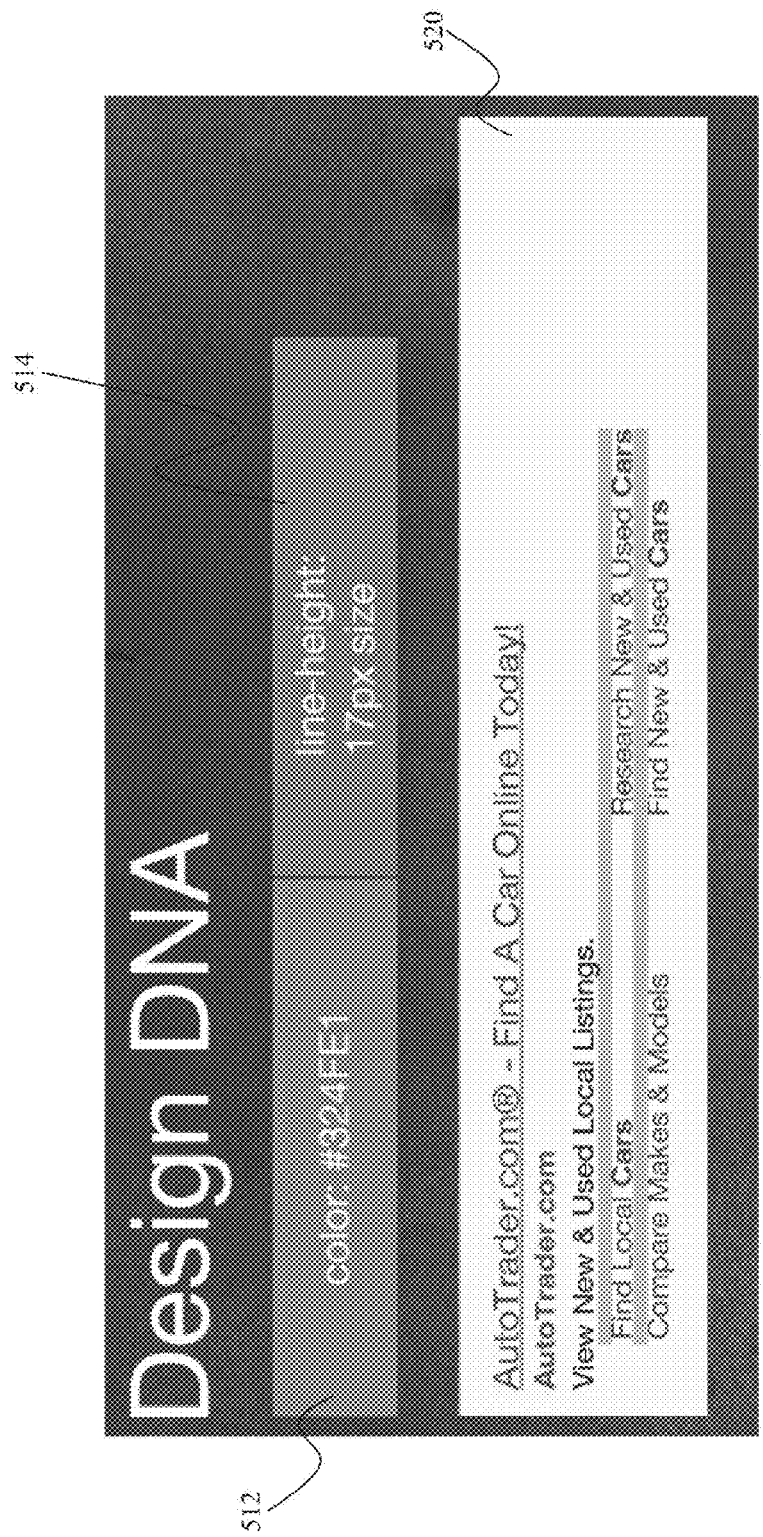
FIG. 5 illustrates an exemplary version of a UI, according to an embodiment of the present teaching.

FIG. 5 illustrates an exemplary version of a UI, according to an embodiment of the present teaching. As shown in FIG. 5, a candidate UI 520 (i.e. a bucket) is presented in accordance with a designed font color of light blue (color code #324FE1) 512 and a designed line height of 17px 514.

Back to FIG. 3, the data-driven optimization unit 304 may generate various buckets for bucket testing. Different buckets represent different candidate UIs with different values of some parameters related to UI: foreground color, background color, line height, line space, font size, font style, margin, etc. In practice, a candidate UI may be generated by modifying a parameter of a default UI that is stored in the user interface database 103. The data-driven optimization unit 304 may retrieve information about the default UI from the user interface database 103 to generate buckets. The data-driven optimization unit 304 may then send the generated buckets to the version test unit 306 for bucket testing.

The version test unit 306 in this example may select a subset of users for each bucket received from the data-driven optimization unit 304. Each subset of users may be selected from a set of users to whom the publisher will render the designed UI. Each subset of users may include a significant number of users to represent the set of users in terms of UI preferences. The version test unit 306 may then send each UI bucket to the corresponding subset of users for bucket testing, via the front end communication unit 308. The front end communication unit 308 in this example may communicate with the users 108 to provide the UI buckets to the users and receive user feedback for the buckets. The user feedback may include user behaviors like clicking, sliding, scrolling, typing, and user dwell time. The front end communication unit 308 may collect the user feedback information and store them into the user feedback database 305.

The data-driven optimization unit 304 may retrieve the user feedback data from the user feedback database 305 and filter the buckets based on a metric. The metric may be price per click, click through rate, long dwell time, short dwell time, etc. For example, if the metric is click through rate, the data-driven optimization unit 304 will calculate the number of users that clicked on a specific link in each UI bucket. The higher the number is, the higher the click through rate is for the UI bucket. The data-driven optimization unit 304 may then filter or remove the UI buckets that have a click through rate lower than a predetermined threshold. The threshold may be determined based on the administrator information and/or dynamically modified based on a machine learning model with user feedback as training data.

In another example, the metric is long dwell time. The data-driven optimization unit 304 may determine the longest dwell time of the users in each UI bucket. The data-driven optimization unit 304 may then remove the UI buckets that have the longest dwell time longer than a predetermined threshold. The threshold may be determined based on the administrator information and/or dynamically modified based on a machine learning model with user feedback as training data.

After filtering, the data-driven optimization unit 304 can identify one or more surviving buckets. In one embodiment, when the predetermined threshold is very tight, there is no surviving bucket. In another embodiment, when the predetermined threshold is very loose, all tested buckets survived. The data-driven optimization unit 304 may determine whether to continue the bucket testing with another round or iteration, based on a stop condition. The stop condition may be based on a maximum number of iterations, a maximum time period of iterations, or total amount of tested parameters specified in the control information from the 320.

If the stop condition is met, the data-driven optimization unit 304 can generate a test result including one or more surviving UI buckets. The data-driven optimization unit 304 may optionally provide the surviving UI buckets to the 320 for preview via the administrator tool 302. If the data-driven optimization unit 304 receives an approval from the 320, the data-driven optimization unit 304 can update the user interface database 103 with the test result. For example, the test result may include two surviving UI candidates and the data-driven optimization unit 304 may store them as default UIs for two groups of users in the user interface database 103. In one embodiment, when there are multiple surviving UI buckets after the stop condition is met, the data-driven optimization unit 304 may identify one of them with a highest score according to the metric. The identified UI bucket can be stored in the user interface database 103 to replace a previous default UI for the users of the publisher. If the data-driven optimization unit 304 receives a denial from the 320, the data-driven optimization unit 304 can remove all buckets in the test result, and may start a new testing if driven by user data.

Figure 6:
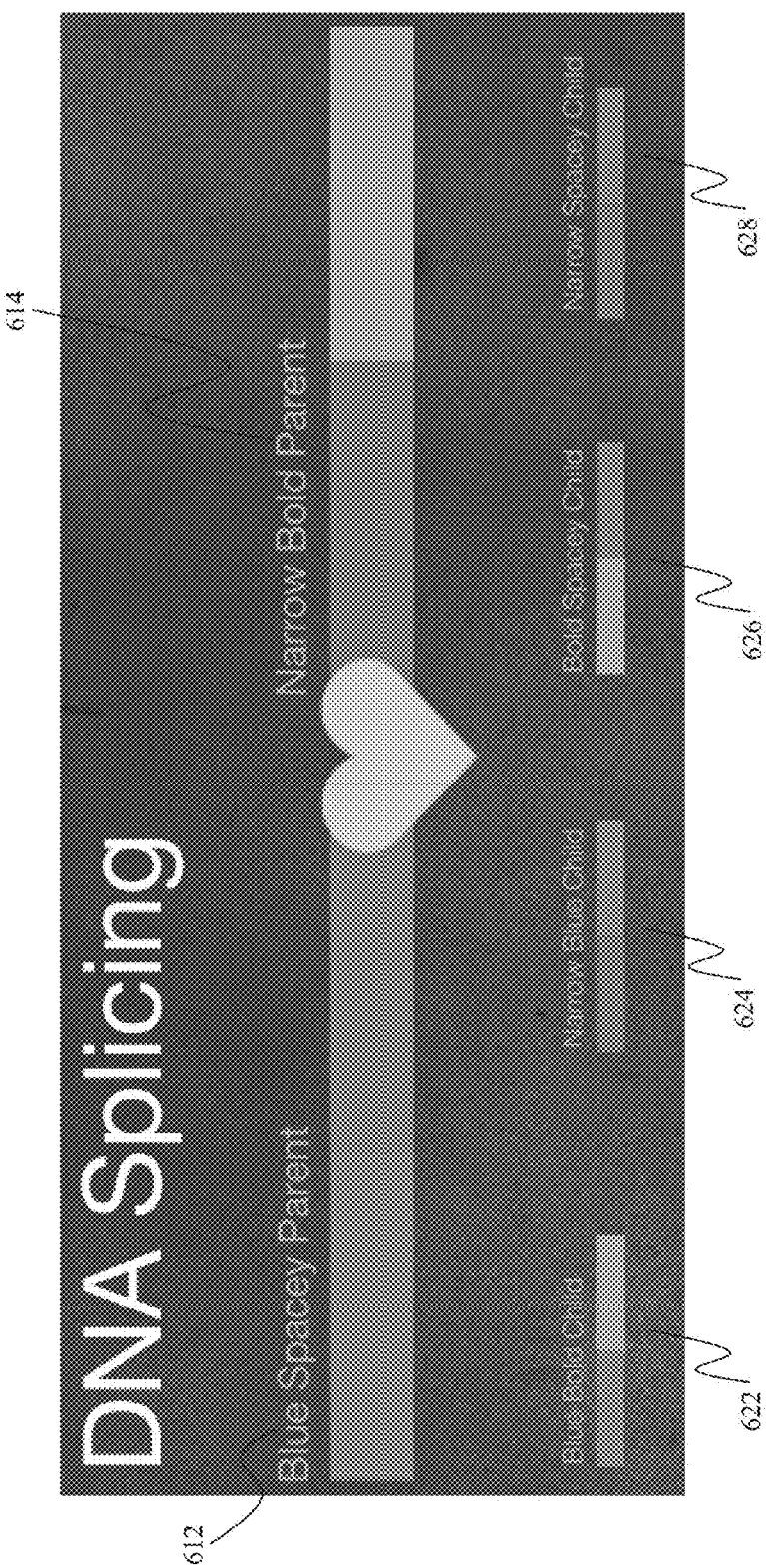
FIG. 6 illustrates an example for generating children UI versions based on parent UI versions, according to an embodiment of the present teaching.

If the stop condition is not met, the data-driven optimization unit 304 may generate new UI buckets (referred as children UI versions) based on the surviving UI buckets (referred as parent UI versions). FIG. 6 illustrates an example for generating children UI versions based on parent UI versions, according to an embodiment of the present teaching. As shown in FIG. 6, there are two surviving UI versions: blue spacey parent 612 and narrow bold parent 614. The data-driven optimization unit 304 in this example may recombine the two parent UI buckets to generate four children UI buckets: blue bold child 622, narrow blue child 624, bold spacey child 626, and narrow spacey child 628. In embodiment, the data-driven optimization unit 304 may also generate new UI buckets by modifying a surviving UI bucket or a UI bucket child. For example, the data-driven optimization unit 304 may also generate a light blue spacey bucket or a light blue bold bucket for future testing.

Back to FIG. 3, the data-driven optimization unit 304 may send the surviving UI buckets from the previous round and the newly generated UI buckets as discussed above to the version test unit 306 for bucket testing in the next round. This forms a loop of process, and the process iterates until the stop condition is met as discussed above.

Figure 4:
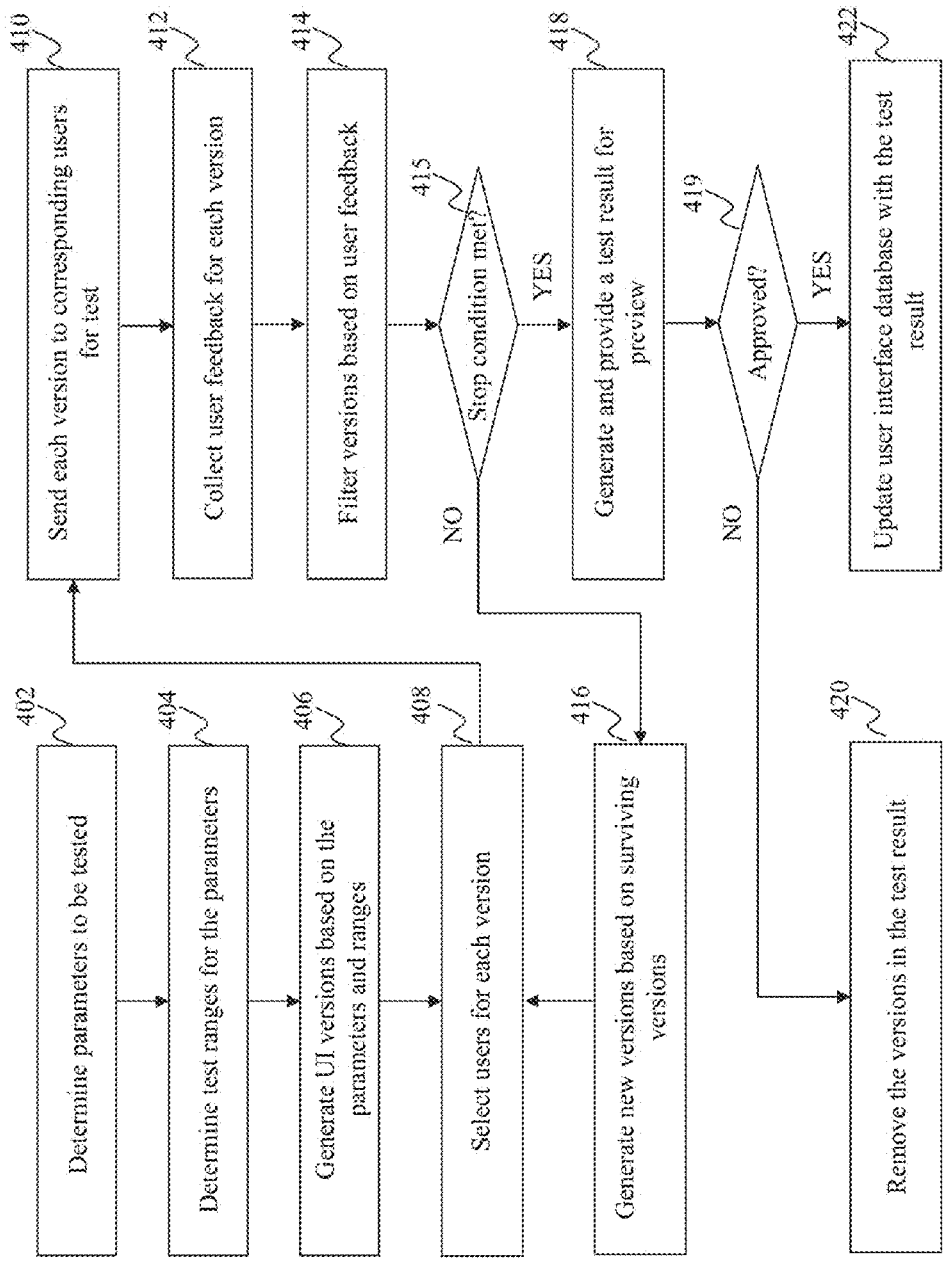
FIG. 4 is a flowchart of an exemplary process performed by a data-driven user interface adapter, according to an embodiment of the present teaching.

FIG. 4 is a flowchart of an exemplary process performed by the data-driven user interface adapter 104, according to an embodiment of the present teaching. At 402, parameters to be tested are determined, e.g. based on control information from the 320. At 404, test ranges for the parameters are determined, e.g. based on control information from the 320. At 406, UI versions are generated based on the parameters and test ranges. At 408, a subset of users is selected for each UI version, i.e. each UI bucket.

At 410, each UI version is sent to the corresponding subset of users for bucket testing. At 412, user feedback is collected for each UI bucket. At 414, UI buckets are filtered based on user feedback and a metric representing user experience and/or revenue for publisher.

Proceeding to 415, it is checked whether a stop condition is met. If so, the process goes to 418, where a test result is generated and optionally provided for preview. The test result may include one or more surviving UI versions. The process then moves to 419. If the stop condition is not met, the process moves to 416, where new UI versions are generated based on the one or more surviving UI versions. The process then moves back to 408 for another round of bucket testing.

At 419, it is checked whether the test result is approved. If so, the process goes to 422, where the user interface database is updated with the test result. For example, a default UI in the user interface database may be replaced by a surviving UI. Otherwise, if the test result is not approved, the process goes to 420, where the surviving UI versions are removed. A new bucket test may start over again if update user feedback is received from the users.

Figure 7:
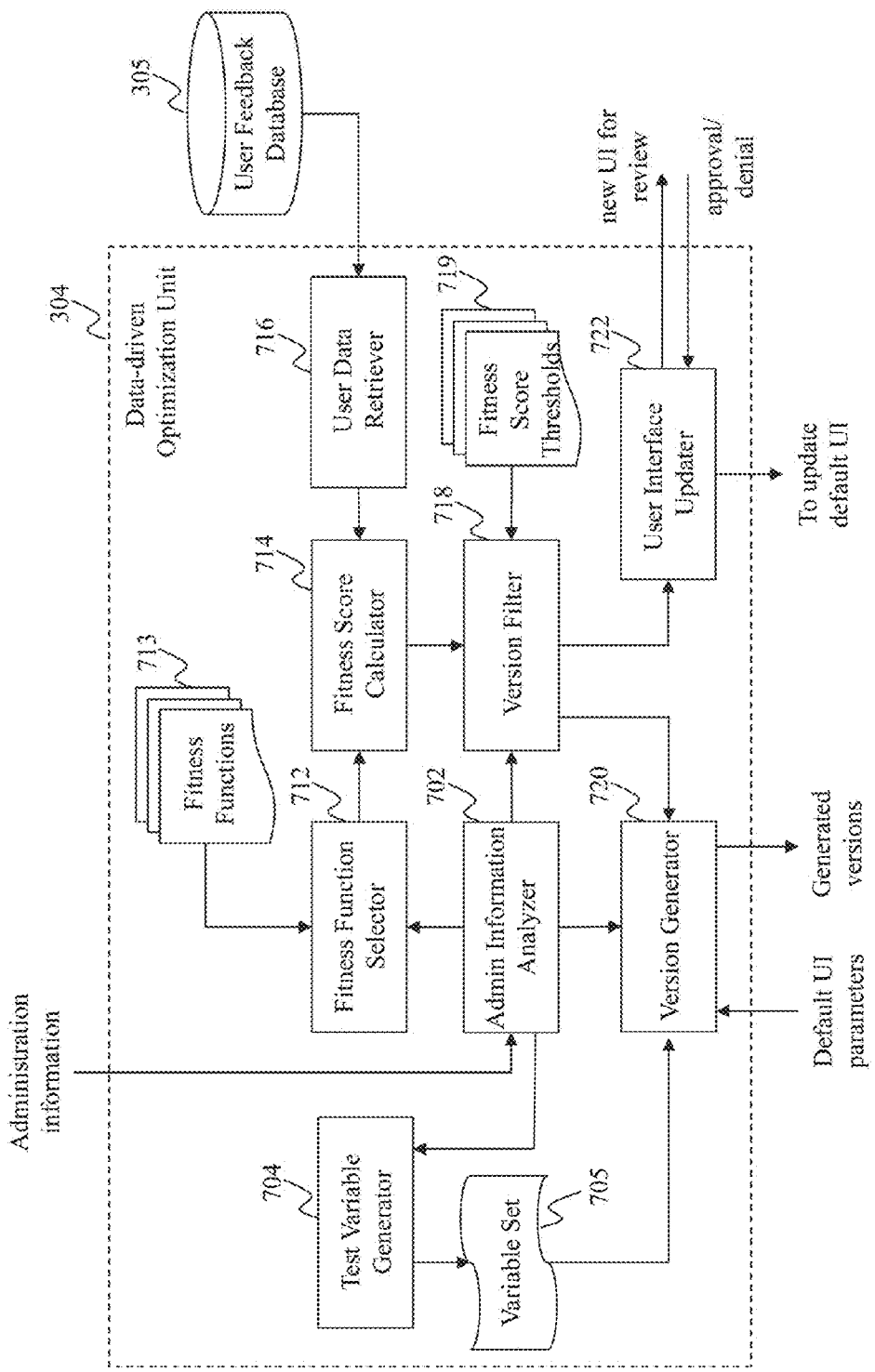
FIG. 7 illustrates an exemplary diagram of a data-driven optimization unit, according to an embodiment of the present teaching.

FIG. 7 illustrates an exemplary diagram of the data-driven optimization unit 304, according to an embodiment of the present teaching. The data-driven optimization unit 304 in this example includes an admin information analyzer 702, a test variable generator 704, a variable set 705, a fitness function selector 712, one or more fitness functions 713, a fitness score calculator 714, a user data retriever 716, a version filter 718, one or more fitness score thresholds 719, a version generator 720, and a user interface updater 722.

The admin information analyzer 702 in this example receives and analyzes administration information from the administrator tool 302. After analysis, the admin information analyzer 702 may generate, based on the administration information, information about parameters to be tested related to a UI, test ranges for the parameters, and other control information related to test candidate generation. The admin information analyzer 702 may send the generated information to the test variable generator 704 for generating test variables. Each test variable represents a parameter to be tested with one or more possible values in its corresponding test range. For example, the test variable generator 704 may generate a variable of font size with values of 11pt, 12pt, 13pt, 14pt, and 15pt; a variable of background color of with values of black, gray, white, and light blue; a variable of margin with values of 2px, 3px, and 4px, etc. The test variable generator 704 may save the generated variables into the variable set 705.

In one embodiment, all parameters related to UI are to be tested based on the administration information. In another embodiment, only a portion of the parameters related to UI is to be tested based on the administration information. The test variable generator 704 may only generate variables based on the parameters to be tested. A UI may be later generated by modifying a default UI with new values of the tested parameters.

The version generator 720 in this example may select and retrieve variables from the variable set 705 to generate UI versions for bucket testing. The version generator 720 may select variables randomly or based on their respective importance regarding a metric, e.g. click through rate. For example, based on previous bucket testing results, font color may have a more significant impact on the click through rate than line height. If so, the version generator 720 may first select different font colors to generate various UI buckets, and test line height in later iterations.

After selecting a variable, the version generator 720 may generate a UI version based on the variable and default UI parameters. The default UI parameters have values of parameters (other than the variable) from a default UI. For example, the variable font size is selected with 13pt. Then the version generator 720 can generate a UI version same as a default UI, except changing the font size to 13pt. If this is the first iteration of bucket testing, there is no surviving bucket from a previous iteration. Accordingly, the version generator 720 can generate UI buckets as much as allowed based on the variables selected from the variable set 705. A maximum number of buckets allowed to be tested per iteration may be specified in the administration information. The version generator 720 can receive the information from the admin information analyzer 702. Once all buckets or UI versions are generated for next iteration of bucket testing, the version generator 720 can send the generated versions to the version test unit 306 for bucket testing.

The admin information analyzer 702 may also analyze the administration information to obtain configuration about the UI design/update. The configuration may specify a purpose of the UI design/update, and hence a metric associated with the purpose. The metric may be price per click, click through rate, long dwell time, short dwell time, etc. The admin information analyzer 702 may send the metric related information to the fitness function selector 712 for selecting one of the one or more fitness functions 713. A fitness function is a function of user data for measuring a corresponding metric. For example, for a metric of click through rate, the fitness function selector 712 may select the fitness function:

CTR=Clicks/Impressions*100%, where CTR represents the click through rate, Clicks represents the number of clicks (from users) on an advertisement, and Impressions represents the number of times the advertisement is shown with a specific UI.

The user data retriever 716 in this example may retrieve user data from the user feedback database 305. The user data may include information related to user behavior like number of clicks from users on an advertisement and include information related to UI presentation like number of times an advertisement is shown with a specific UI. The user data retriever 716 may retrieve user data related to each UI bucket in a previous round of testing and send the user data to the fitness score calculator 714.

The fitness score calculator 714 may calculate a fitness score for each UI bucket in the previous round based on the fitness function and the corresponding user data. A fitness score may be a form of number or symbol representing the likelihood for a UI bucket to be preferred by users and/or the likelihood for a UI bucket to bring revenue to the publisher. In the above example related to click through rate, the fitness score may be the click through rate for each UI bucket or a function of the click through rate. The fitness score calculator 714 can send the fitness scores of the UI buckets to the version filter 718 for filtering.

The version filter 718 in this example compares the fitness scores of the UI buckets from the previous iteration with a predetermined threshold. The threshold may be selected from the one or more fitness score thresholds 719. Each fitness score threshold may correspond to a fitness function and be determined based on previous bucket testing experience. The threshold may be modified dynamically based on performance of the bucket testing, e.g. its accuracy, efficiency, and/or effectivity. The threshold may also be selected based on administration information analyzed at the admin information analyzer 702. Based on the comparing, the version filter 718 may remove the UI buckets that have fitness scores less than the predetermined threshold. As such, the version filter 718 can identify the surviving UI buckets that have fitness scores not less than the predetermined threshold. The version filter 718 may send the surviving UI buckets to the version generator 720 or the user interface updater 722, depending on whether a stop condition is met.

As discussed above, a stop condition is condition to stop the bucket testing and return the test result. A stop condition may be based on a maximum number of iterations, a maximum time period of iterations, or total amount of tested parameters specified in the control information or administration information from the 320. For example, if a maximum number of iterations is 50, the version filter 718 may determine whether to stop bucket testing by determining whether the bucket testing has iterated 50 times. If so, the version filter 718 can send the surviving UI buckets to the user interface updater 722 for generating a test result. Otherwise, the version filter 718 can send the surviving UI buckets to the version generator 720 for generating more UI buckets for next iteration of bucket testing. In one embodiment, the stop condition may be a combined condition related to multiple limitations. For example, the bucket testing is stopped only when both maximum number of iterations and maximum time period of iterations are met.

If the stop condition is not met, the version generator 720 can receive the surviving UI buckets from the version filter 718 and generate new UI buckets based on the surviving buckets. As discussed above, the new UI buckets may be children of the surviving buckets as illustrated in FIG. 6. The new UI buckets may also be generated based on mutation or slight modification of the surviving buckets. After generating new UI buckets based on surviving buckets, the version generator 720 may generate more UI buckets to test more variables from the variable set 705, if the number of buckets to be tested for next iteration has not reached the limit. The version generator 720 may then send the UI buckets to the version test unit 306 for bucket testing of next iteration.

If the stop condition is met, the user interface updater 722 may receive the surviving UI buckets from the version filter 718 and generate a test result based on the surviving buckets. In one embodiment, the user interface updater 722 may generate a test result to include all surviving UI buckets from the version filter 718. Accordingly, the user interface updater 722 may replace a default UI in the user interface database 103 with the surviving UI buckets as multiple default UIs, each of which to be provided to a different group of users, or to the same group of users but in different time periods. In another embodiment, the user interface updater 722 may generate a test result to include a portion of the surviving UI buckets from the version filter 718. For example, the user interface updater 722 may select one UI bucket that has the highest fitness score among the surviving UI buckets. Accordingly, the user interface updater 722 may update a default UI in the user interface database 103 with the selected UI.

Before updating the default UI in the user interface database 103, the user interface updater 722 may optionally send the test result to the 320 for a preview. In that situation, the user interface updater 722 will only update the default UI with the new UIs in the test result after receiving an approval from the 320. If the 320 denies the test result, the user interface updater 722 will not update the default UI. This may happen if the test result includes a trivial UI, e.g. black text in black background, or when the test result includes too many surviving UI buckets, which indicates a poor convergence performance of the bucket testing. In those situations, the 320 may accordingly modify the administration information for future bucket testing.

In one embodiment, if the 722 plans to replace/update a default UI with a new UI that is very different from the default UI, the 722 can find an optimal evolutionary path from the default UI to the new UI. For example, the 722 may make small subtle changes to the default UI over time until it finally reaches the new UI design. This can reduce potential complaints from users because users generally prefer gradual changes to sudden major changes.

Figure 8:
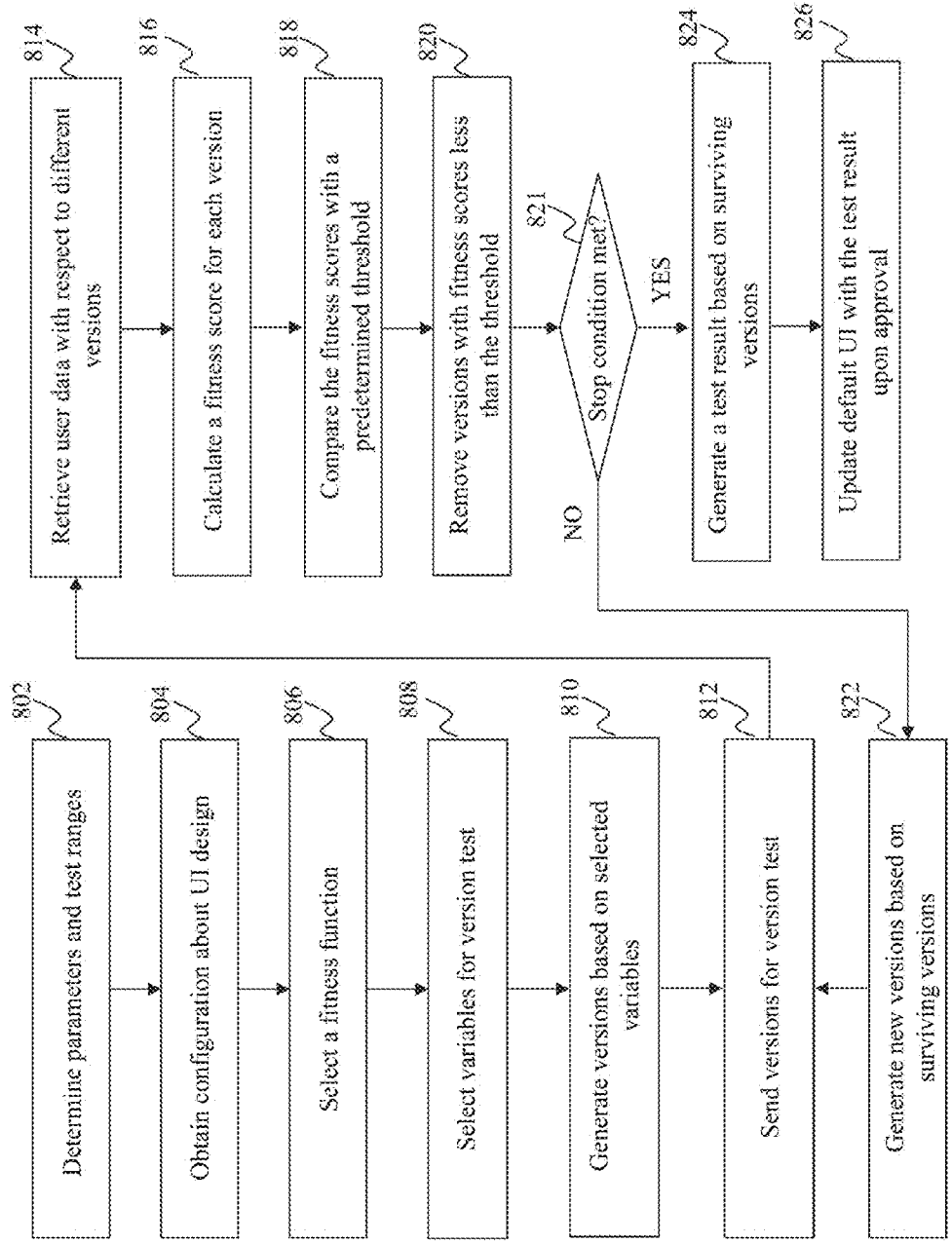
FIG. 8 is a flowchart of an exemplary process performed by a data-driven optimization unit, according to an embodiment of the present teaching.

FIG. 8 is a flowchart of an exemplary process performed by the data-driven optimization unit 304, according to an embodiment of the present teaching. At 802, parameters to be tested and their corresponding test ranges are determined, e.g. based on administration or control information from the 320. At 804, configuration about the UI design is obtained e.g. based on control or administration information from the 320. At 806, a fitness function is selected, e.g. based on the configuration. At 808, variables are selected for version/bucket test. At 810, UI versions/buckets are generated based on selected variables.

At 812, UI buckets are sent for bucket testing. At 814, user data are retrieved with respect to different UI buckets. At 816, a fitness score is calculated for each UI bucket. At 818, the fitness scores are compared with a predetermined threshold. At 820, UI buckets with fitness scores less than the threshold are removed to generate one or more surviving UI buckets.

Proceeding to 821, it is checked whether a stop condition is met. If so, the process goes to 824, where a test result is generated based on the surviving UI buckets. Then at 826, the default UI is updated with the test result, optionally upon approval from the 320. If the stop condition is not met at 821, the process moves to 822, where new UI versions are generated based on the one or more surviving UI buckets. The process then moves back to 812 for another round of bucket testing.

Figure 9:
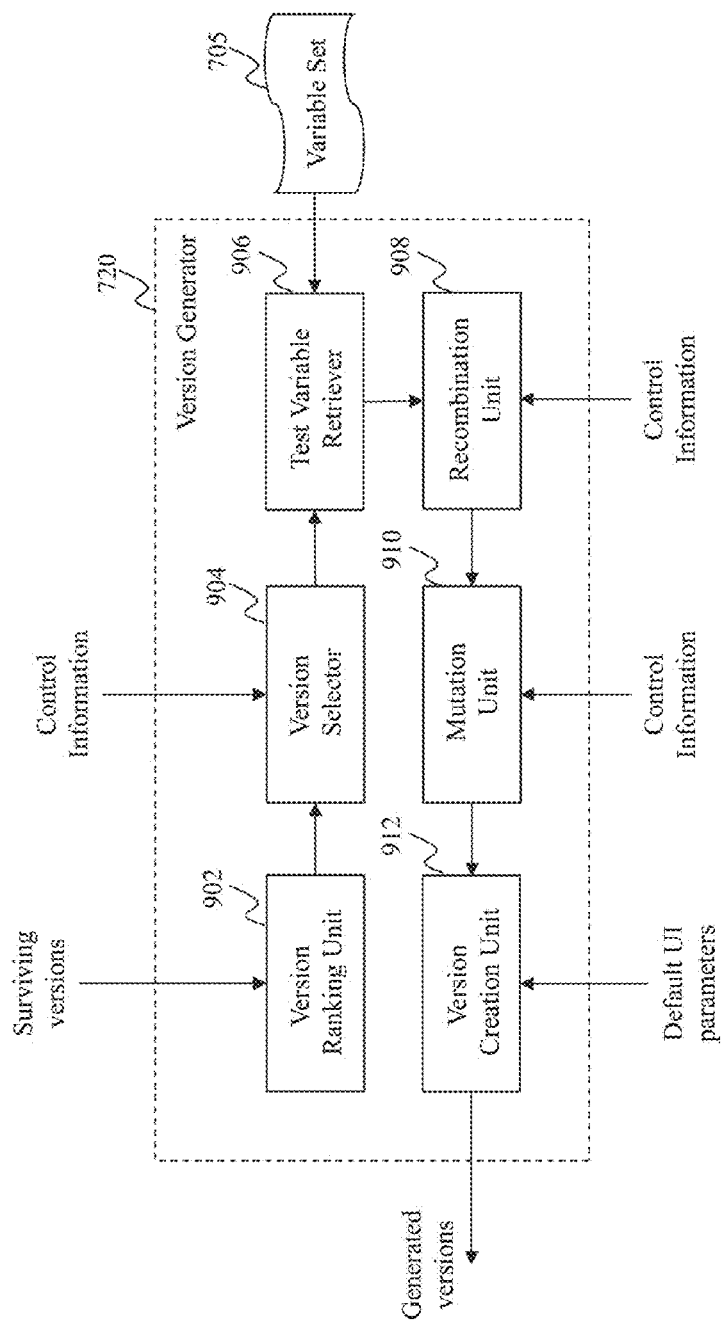
FIG. 9 illustrates an exemplary diagram of a version generator, according to an embodiment of the present teaching.

FIG. 9 illustrates an exemplary diagram of the version generator 720, according to an embodiment of the present teaching. The version generator 720 in this example includes a version ranking unit 902, a version selector 904, a test variable retriever 906, a recombination unit 908, a mutation unit 910, and a version creation unit 912.

The version ranking unit 902 in this example receives surviving UI versions from the version filter 718. Each surviving UI version may have a fitness score representing its likelihood to be preferred by users or to bring revenue for the publisher. The version ranking unit 902 may rank the surviving UI versions based on their respective fitness scores and send a ranked list of UI versions to the version selector 904.

The version selector 904 in this example receives control information from the admin information analyzer 702. As discussed above, the control information may come from the administration information and indicate how to perform bucket testing. In one example, the control information here may indicate that all surviving UI versions can be utilized to generate new UI versions. In another example, the control information may indicate that only top ranked (e.g. top 5) surviving UI versions can be utilized to generate new UI versions. In yet another example, the control information may indicate that only surviving UI versions with fitness scores higher than a threshold can be utilized to generate new UI versions. Based on the control information, the version selector 904 may select corresponding UI versions from the surviving UI versions for new UI version generation.

The test variable retriever 906 in this example can retrieve variables from the variable set 705. To generate new UI versions, the version generator 720 may need information about what variables can be changed; within what range each variable can be changed; what variables have been tested; and what variables need to be tested. The test variable retriever 906 may obtain the above information from the variable set 705 and a memory or storage associated with the test variable retriever 906. The test variable retriever 906 can send the above information to the recombination unit 908 for UI version recombination.

The recombination unit 908 in this example generates new UI versions by recombining some surviving UI versions. In one embodiment, the recombination unit 908 performs recombination based on the UI versions selected by the version selector 904. Referring to the above example in FIG. 6, four new UI versions (blue bold child 622, narrow blue child 624, bold spacey child 626, and narrow spacey child 628) are generated based on two surviving UI versions (blue spacey parent 612 and narrow bold parent 614). The relationship between the surviving versions and the generated new versions is like parents and children, where children can inherit DNA from their parents. For example, the blue bold child 622 inherits both a DNA feature "blue" from the blue spacey parent 612 and a DNA feature "bold" from the narrow bold parent 614.

Back to FIG. 9, the recombination unit 908 in this example may receive information about the variables from the test variable retriever 906. Based on that information, the recombination unit 908 can determine what variables can be changed; within what range each variable can be changed; what variables have been tested; and what variables need to be tested. Accordingly, the recombination unit 908 can avoid generating a new UI version including a variable that cannot be changed or a variable with a value exceeding the predetermined range. The recombination unit 908 can also avoid generating a UI version that has been tested before already.

The recombination unit 908 may also receive control information from the admin information analyzer 702. The control information may indicate some limitations or restrictions on certain combinations of values. In one example, the control information may indicate to avoid a recombination of text and background with a same color, which can make the text invisible. In another example, the control information may indicate to avoid a recombination of large font size and large line height, which can make the padding or margin shrink to zero. The recombination unit 908 can avoid generating new UI versions falling into the restrictions specified by the control information. In one embodiment, the recombination unit 908 does not generate any new UI versions because all possible combinations are restricted by the control information.

The control information may also indicate a maximum number of UI versions that can be tested per iteration. The recombination unit 908 can ensure the total number of available UI versions (surviving versions and recombined versions) does not exceed the maximum number.

The recombination unit 908 can send the generated new UI versions and the surviving UI versions to the mutation unit 910 for mutation. The mutation may mean a modification of a variable in a UI version. For example, a UI version with font size of 13pt can be mutated to generate a new UI version with font size of 14pt; a UI version with margin of 3px can be mutated to generate a new UI version with margin of 4px. The mutation unit 910 in this example may apply mutation based on the new UI versions generated at the recombination unit 908 and/or the surviving UI versions from a previous iteration.

The mutation unit 910 in this example may receive information about the variables from the test variable retriever 906, e.g. passed by the recombination unit 908. Similarly to the recombination unit 908, based on that information, the mutation unit 910 can determine what variables can be changed; within what range each variable can be changed; what variables have been tested; and what variables need to be tested. Accordingly, the mutation unit 910 can avoid generating a new mutated UI version including a variable that cannot be changed or a variable with a value exceeding the predetermined range. The mutation unit 910 can also avoid generating a mutated UI version that has been tested before already.

The mutation unit 910 may also receive control information from the admin information analyzer 702. As discussed above, the control information may indicate some limitations or restrictions on certain combinations of values. The mutation unit 910 can avoid generating new mutated UI versions falling into the restrictions specified by the control information. For example, if the text color is black, the mutation unit 910 can avoid mutating the background color to be black as well. In one embodiment, the mutation unit 910 does not generate any new UI versions because all possible mutations are restricted by the control information.

The control information may indicate a mutation limit for the mutation unit 910. The mutation limit 910 may be a percentage number representing a maximum rate each UI version can be mutated. For example, a mutation limit of 100% means every UI version can be mutated to generate one UI version. For example, a mutation limit of 200% means every UI version can be mutated to generate two UI versions. The mutation unit 910 can ensure the mutation does not exceed the mutation limit.

The control information may also indicate a maximum number of UI versions that can be tested per iteration. The mutation unit 910 can ensure the total number of available UI versions (surviving versions, recombined versions, and mutated versions) does not exceed the maximum number.

The version creation unit 912 in this example receives the surviving versions, the recombined versions, and/or the mutated versions for next iteration. The version creation unit 912 can determine whether more versions are needed. For example, if the total number of the surviving versions, the recombined versions, and the mutated versions is less than the maximum number, more UI versions can be created. In that case, the version creation unit 912 may create more UI versions based on retrieved variables from the test variable retriever 906.

In one embodiment, the version creation unit 912 may also create a control UI version based on default user interface parameters from the user interface database 103. The control version may represent a default UI being provided to users before the bucket testing. User feedback regarding the control version can be utilized as a benchmark for evaluating the tested UI buckets. For example, the fitness score threshold can be determined or selected based on the fitness score of the control UI version.

The version creation unit 912 may then send the available UI versions to the version test unit 306 for bucket testing in next iteration. The available UI versions may include the surviving UI versions from the previous iteration, the recombined UI versions generated at the recombination unit 908, the mutated UI versions generated at the mutation unit 910, and/or more UI versions including the control version generated at the version creation unit 912.

Figure 10:
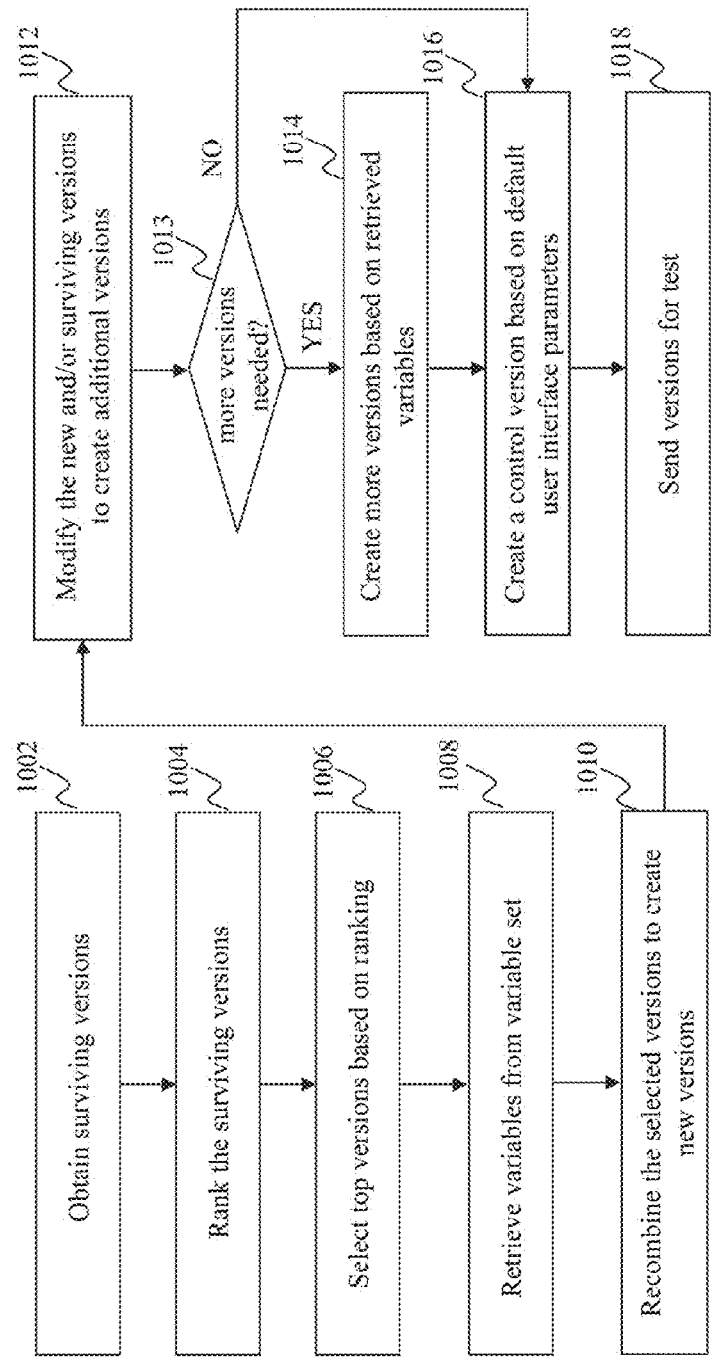
FIG. 10 is a flowchart of an exemplary process performed by a version generator, according to an embodiment of the present teaching.

FIG. 10 is a flowchart of an exemplary process performed by the version generator 720, according to an embodiment of the present teaching. At 1002, surviving UI versions from previous iteration are obtained. At 1004, the surviving UI versions are ranked e.g. based on their respective fitness scores. At 1006, top UI versions may be selected, e.g. based on their respective fitness scores or rankings. At 1008, variables are retrieved from the variable set. At 1010, the selected UI versions are recombined to create new UI versions. At 1012, the new and/or surviving UI versions are modified to create additional UI versions.

Proceeding to 1013, it is checked whether more UI versions are needed, e.g. based on a maximum number of UI versions allowed to be tested per iteration. If so, the process goes to 1014, where more UI versions are created based on retrieved variables, and the process moves on to 1016. Otherwise, the process goes directly to 1016.

At 1016, a control version is created based on default user interface parameters. The control UI version may or may not be counted when checking whether more UI versions are needed. At 1018, the available UI versions are sent for test.

Figure 11:
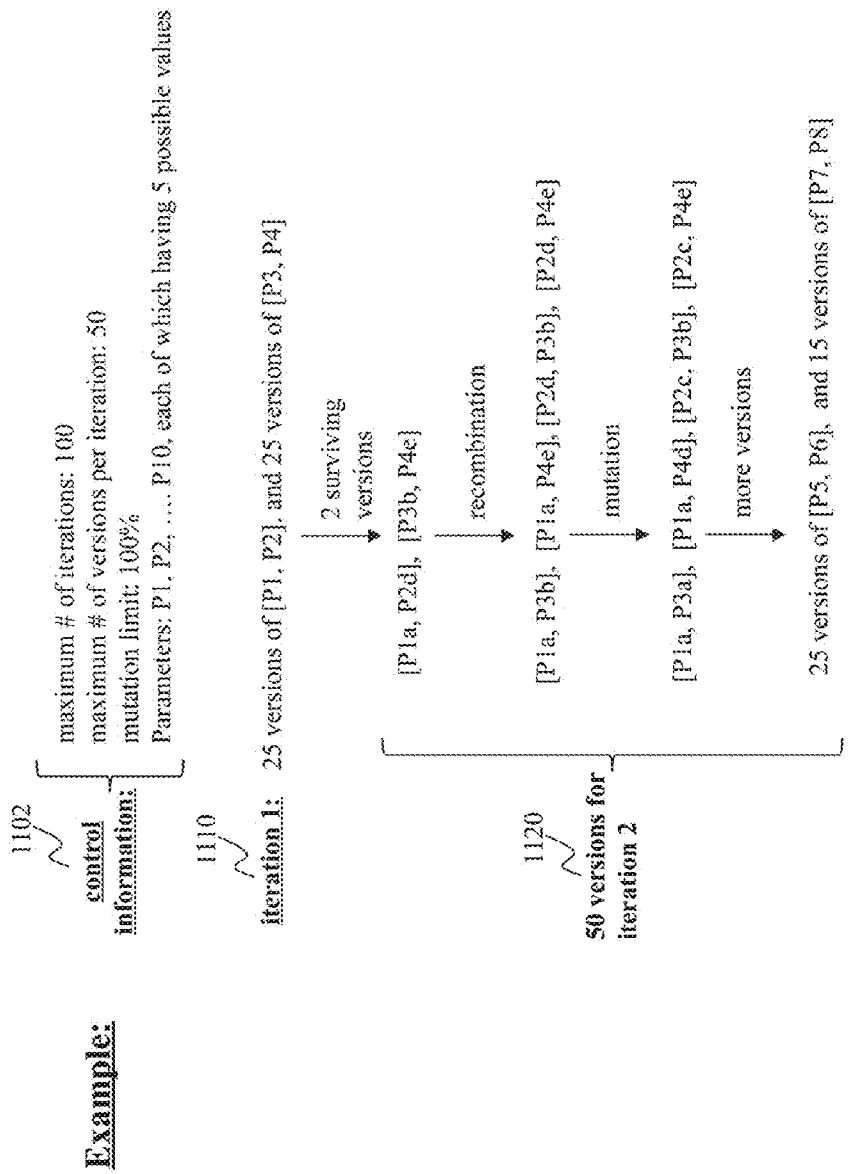
FIG. 11 illustrates an example for designing a data driven UI, according to an embodiment of the present teaching.

FIG. 11 illustrates an example for designing a data driven UI, according to an embodiment of the present teaching. As shown in FIG. 11, the control information 1102 indicates that: the maximum number of iterations is 100; the maximum number of UI versions per iteration is 50; the mutation limit is 100%; and the parameters include P1, P2, . . . . P10, each of which having 5 possible values.

In iteration 1, 1110, the system selected 25 UI versions of [P1, P2] and 25 UI versions of [P3, P4]. Because each parameter here has 5 possible values, there are 25 possible value combinations of [P1, P2]. Each combination can be utilized to generate a UI version by modifying a default UI with the combination. Similarly, there are 25 possible value combinations of [P3, P4], each of which can be utilized to generate a UI version. The system may test the 50 UI versions in iteration 1, each version corresponding to 2% of users of the publisher. The default UI may be one of the 50 UI versions, or may be an extra version whose fitness score has been determined before the bucket testing.

In the example of FIG. 11, there are two surviving UI versions after iteration 1: [P1a, P2d] and [P3b, P4e], where [P1a, P2d] represents a UI version having P1 of value "a" and P2 of value "d"; and [P3b, P4e] represents a UI version having P3 of value "b" and P4 of value "e". The system then recombines the two UI versions [P1a, P2d] and [P3b, P4e] to generate four children UI versions: [P1a, P3b], [P1a, P4e], [P2d, P3b], and [P2d, P4e]. The system then generates four mutated UI versions: [P1a, P3a], [P1a, P4d], [P2c, P3b], and [P2c, P4e].

There are 10 available UI versions (2 surviving versions, 4 recombined versions, and 4 mutated versions), which is less than the maximum number 50 versions per iteration. Accordingly, the system generates 40 more UI versions: 25 versions of [P5, P6] and 15 versions of [P7, P8]. (The other 10 versions

[P7, P8] may be tested in later iterations.) The system sends the 50 UI versions for bucket testing in iteration 2, 1120.

Figure 12:
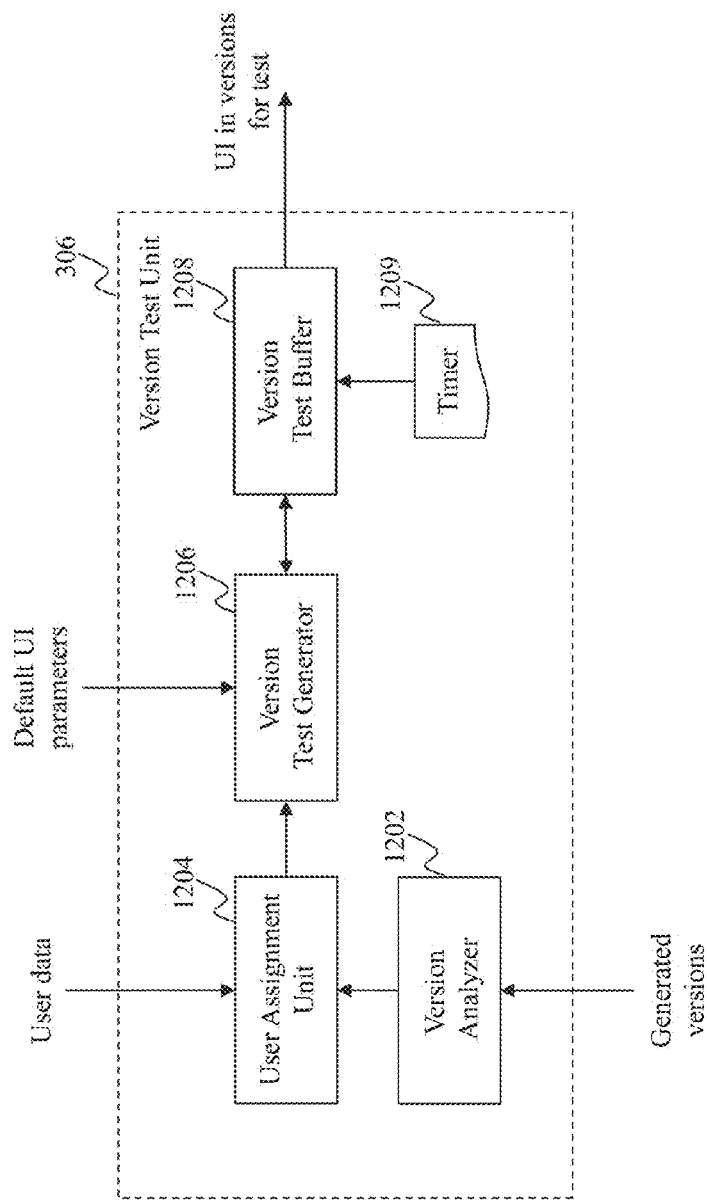
FIG. 12 illustrates an exemplary diagram of a version test unit, according to an embodiment of the present teaching.

FIG. 12 illustrates an exemplary diagram of the version test unit 306, according to an embodiment of the present teaching. The version test unit 306 in this example includes a version analyzer 1202, a user assignment unit 1204, a version test generator 1206, a version test buffer 1208, and a timer 1209. The version analyzer 1202 in this example receives generated UI versions from the data-driven optimization unit 304. As discussed above, the generated UI versions may include surviving UI versions from the previous iteration, recombined UI versions, mutated UI versions, and/or additional UI versions including the control version. The version analyzer 1202 can analyze the generated versions to determine their respective characteristics.

The user assignment unit 1204 in this example can select users for each UI version based on its characteristic. For example, the user assignment unit 1204 may assign a surviving UI version from previous iteration to a small group of users which is different from the previous group of users reviewing the UI. The user assignment unit 1204 may also assign a new UI version to a large group of users to collect more user data. In general, since the final UI will be provided to a large set of users, the user assignment unit 1204 may try to avoid assigning a UI version to a subset of users having bias against the UI version. For example, if older users prefer large font size but younger users do not like large font size, the user assignment unit 1204 can assign a UI version with large font size to a group of users including both older and younger users. The user assignment unit 1204 may also assign a UI version based on user data regarding previous UI version assignment.

In one embodiment, the users have been pre-selected for bucket testing. In that case, the final UI will be provided to a specific group of users, e.g. older users. Then the user assignment unit 1204 may modify the user assignment strategy accordingly. For example, the users may be pre-selected based on their geolocation, gender, device type, device screen size, local weather condition, age group, sentiment analysis of content on the page, etc. The UI bucket test may be designed for a specific group of users. The UI bucket test may also be designed for a specific market. For example, Asia market may have different preference of UI than U.S. market. In addition, the UI bucket test may also be designed for a specific traffic source. For example, a third party publisher 110-1 may yield a different optimal UI than another third party publisher 110-2.

The version test generator 1206 in this example creates version test information for each UI version. For each UI version, the version test generator 1206 may create a test for providing the UI version to a corresponding assigned group of users. In one embodiment, the generated versions received by the version analyzer 1202 do not include all information about the UI. In that situation, the version test generator 1206 may retrieve default UI parameters from the user interface database 103 to create the version test information.

The version test buffer 1208 in this example stores the generated tests from the version test generator 1206, and sends them to the corresponding users according to the timer 1209. For example, the configuration may request to test 10 UI versions every minute, although the version test generator 1206 has generated 50 buckets for test in current iteration. The version test buffer 1208 can determine whether all UI versions in current iteration have been tested. If not, the version test buffer 1208 will continue receiving the buckets from the version test generator 1206 and sending them for test, e.g. periodically. If all UI versions in current iteration have been tested, the version test buffer 1208 will wait for next iteration.

Figure 13:
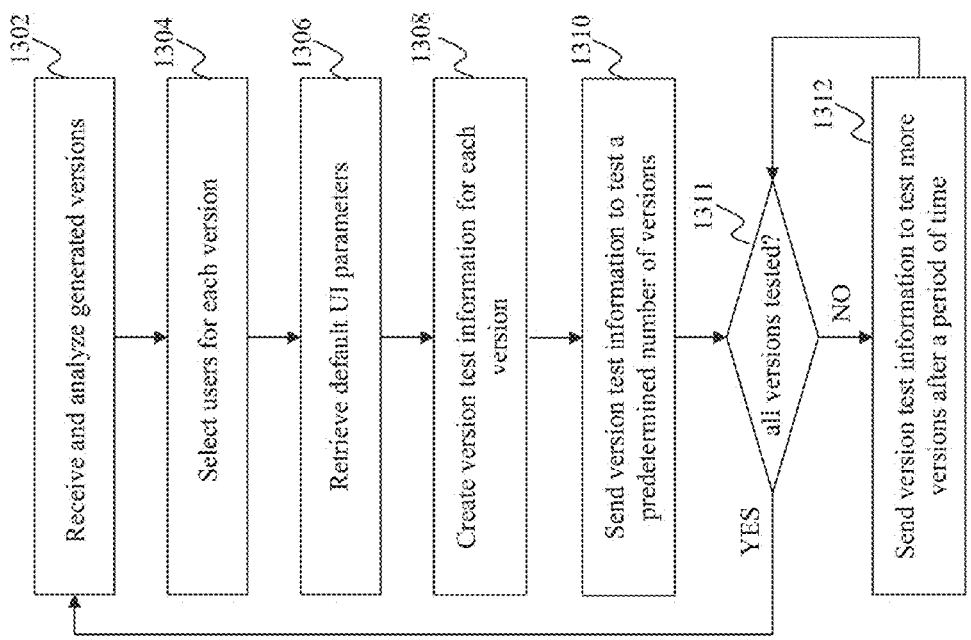
FIG. 13 is a flowchart of an exemplary process performed by a version test unit, according to an embodiment of the present teaching.

FIG. 13 is a flowchart of an exemplary process performed by the version test unit 306, according to an embodiment of the present teaching. At 1302, generated versions are received and analyzed. At 1304, users are selected for each UI version. Optionally at 1306, default UI parameters are retrieved. At 1308, version test information is created for each UI version. At 1310, version test information is sent to test a predetermined number of UI versions. The predetermined number may be determined based on a timer or configuration of the system.

Proceeding to 1311, it is checked whether all UI versions in current iteration have been tested. If so, the process goes back to 1302 to wait for next iteration. Otherwise, the process goes to 1312, where version test information is sent to test more versions after a period of time. Then the process may move to 1311 to check again.

Figure 14:
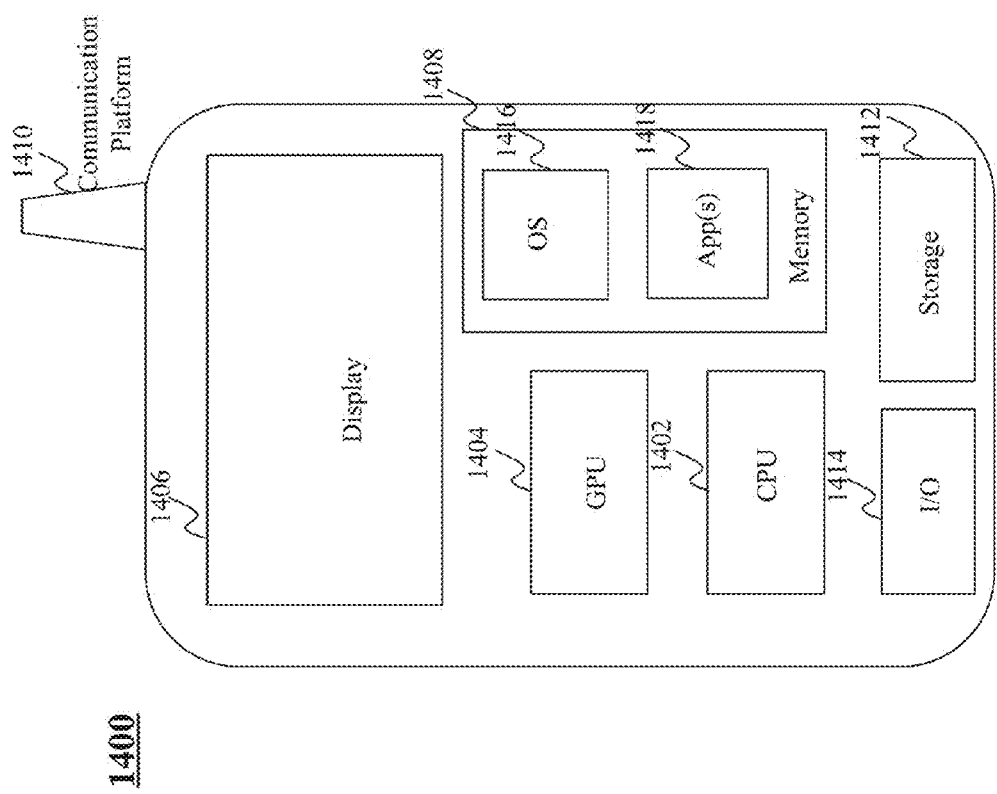
FIG. 14 depicts a general mobile device architecture on which the present teaching can be implemented.

FIG. 14 depicts a general mobile device architecture on which the present teaching can be implemented. In this example, the user device 108 is a mobile device 1400, including but is not limited to, a smart phone, a tablet, a music player, a handled gaming console, a GPS receiver. The mobile device 1400 in this example includes one or more central processing units (CPUs) 1402, one or more graphic processing units (GPUs) 1404, a display 1406, a memory 1408, a communication platform 1410, such as a wireless communication module, storage 1412, and one or more input/output (I/O) devices 1414. Any other suitable component, such as but not limited to a system bus or a controller (not shown), may also be included in the mobile device 1400. As shown in FIG. 14, a mobile operating system 1416, e.g., iOS, Android, Windows Phone, etc., and one or more applications 1418 may be loaded into the memory 1408 from the storage 1412 in order to be executed by the CPU 1402. The applications 1418 may include a web browser or any other suitable mobile search apps. Execution of the applications 1418 may cause the mobile device 1400 to perform some processing as described before. For example, the display of a UI is made by the GPU 1404 in conjunction with the display 1406. User inputs regarding a UI can be received via the I/O devices 1414 and sent to the data-driven user interface adapter 104 via the communication platform 1410.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 15:
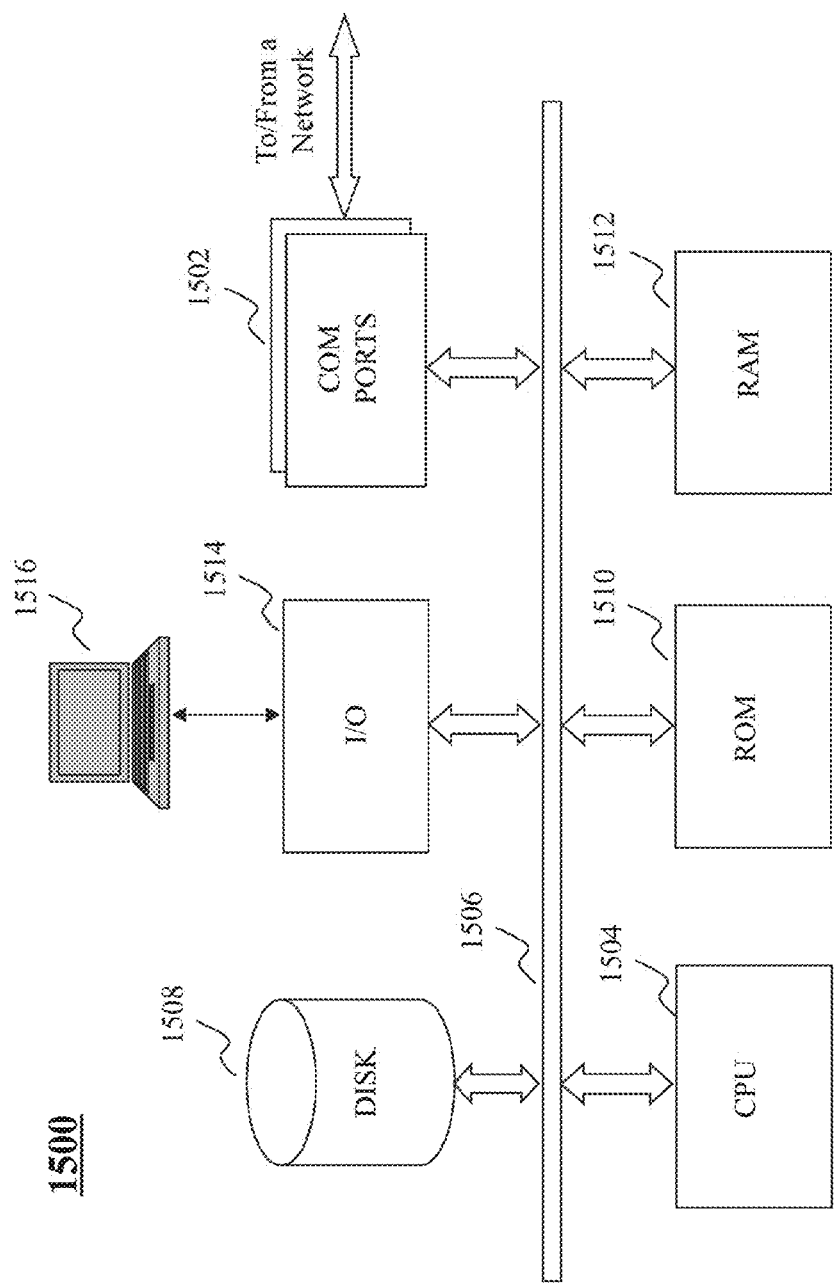
FIG. 15 depicts a general computer architecture on which the present teaching can be implemented.

FIG. 15 depicts a general computer architecture on which the present teaching can be implemented and has a functional block diagram illustration of a computer hardware platform that includes user interface elements. The computer may be a general-purpose computer or a special purpose computer. This computer 1500 can be used to implement any components of the UI adaptation architecture as described herein. Different components of the system, e.g., as depicted in FIGS. 1 and 2, can all be implemented on one or more computers such as computer 1500, via its hardware, software program, firmware, or a combination thereof. Although only one such computer is shown, for convenience, the computer functions relating to UI adaptation may be implemented in a distributed fashion on a number of similar platforms, to distribute the processing load.

The computer 1500, for example, includes COM ports 1502 connected to and from a network connected thereto to facilitate data communications. The computer 1500 also includes a CPU 1504, in the form of one or more processors, for executing program instructions. The exemplary computer platform includes an internal communication bus 1506, program storage and data storage of different forms, e.g., disk 1508, read only memory (ROM) 1510, or random access memory (RAM) 1512, for various data files to be processed and/or communicated by the computer, as well as possibly program instructions to be executed by the CPU 1504. The computer 1500 also includes an I/O component 1514, supporting input/output flows between the computer and other components therein such as user interface elements 1516. The computer 1500 may also receive programming and data via network communications.

Hence, aspects of the method of UI adaptation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for providing a user interface to a plurality of users, the method comprising:
  determining a plurality of candidate user interfaces each of which is associated with one or more parameters related to a user interface;
  providing each of the plurality of candidate user interfaces to a subset of users selected from the plurality of users;
  obtaining inputs from the plurality of users with respect to each of the plurality of candidate user interfaces;
  selecting one or more candidate user interfaces from the plurality of candidate user interfaces based on the inputs;
  generating a new candidate user interface based on the selected one or more candidate user interfaces;
  identifying a user interface based on the new candidate user interface and the selected one or more candidate user interfaces; and
  providing the identified user interface to the plurality of users.

2. The method of claim 1, wherein the determining comprises:
  obtaining a plurality of parameters related to a user interface, wherein each of the plurality of parameters is associated with a predetermined range; and
  determining the plurality of candidate user interfaces each of which is associated with one or more parameters selected from the plurality of parameters, wherein each of the one or more parameters has a value within the predetermined range.

3. The method of claim 1, wherein the one or more parameters include at least one of: foreground color, background color, line height, line space, font size, font style, and margin.

4. The method of claim 1, wherein the plurality of candidate user interfaces includes a default user interface that was previously provided to the plurality of users.

5. The method of claim 4, wherein providing each of the plurality of candidate user interfaces comprises:
comparing each of the plurality of candidate user interfaces with the default user interface;
selecting a subset of users from the plurality of user for each of the plurality of candidate user interfaces based on the comparing; and
providing each of the plurality of candidate user interfaces to the subset of users.

6. The method of claim 1, wherein the selecting includes:
determining a metric associated with a user interface;
calculating a score for each of the plurality of candidate user interfaces based on the inputs in accordance with the metric; and
selecting one or more candidate user interfaces from the plurality of candidate user interfaces based on their respective scores.

7. The method of claim 6, wherein the metric is related to at least one of:
revenue of a publisher associated with the identified user interface; and
user experience of the plurality of users with respect to a user interface.

8. The method of claim 1, wherein the new candidate user interface is generated by at least one of:
recombining the one or more parameters associated with the selected one or more candidate user interfaces;
modifying a value of a parameter within one of the selected one or more candidate user interfaces; and
modifying a value of a parameter after recombining the one or more parameters associated with the selected one or more candidate user interfaces.

9. The method of claim 1, wherein the identifying further comprises:
providing each of the new candidate user interface and selected one or more candidate user interfaces to a subset of users selected from the plurality of users;
obtaining inputs from the plurality of users with respect to the provided candidate user interfaces;
selecting one or more candidate user interfaces from the provided candidate user interfaces;
determining whether a predetermined condition is met; and
generating a user interface based on the selected one or more candidate user interfaces if the predetermined condition is met.

10. A system having at least one computing device each of which has at least one processor, storage, and a communication platform connected to a network for providing a user interface to a plurality of users, the system comprising:
a control information analyzer configured for determining a plurality of candidate user interfaces each of which is associated with one or more parameters related to a user interface;
a version test unit configured for providing each of the plurality of candidate user interfaces to a subset of users selected from the plurality of users;
a user data retriever configured for obtaining inputs from the plurality of users with respect to each of the plurality of candidate user interfaces;
a version filter configured for selecting one or more candidate user interfaces from the plurality of candidate user interfaces based on the inputs;
a version generator configured for generating a new candidate user interface based on the selected one or more candidate user interfaces;
a user interface updater configured for identifying a user interface based on the new candidate user interface and the selected one or more candidate user interfaces and providing the identified user interface to the plurality of users.

11. The system of claim 10, wherein the control information analyzer is further configured for:
obtaining a plurality of parameters related to a user interface, wherein each of the plurality of parameters is associated with a predetermined range; and
determining the plurality of candidate user interfaces each of which is associated with one or more parameters selected from the plurality of parameters, wherein each of the one or more parameters has a value within the predetermined range.

12. The system of claim 10, wherein the one or more parameters include at least one of: foreground color, background color, line height, line space, font size, font style, and margin.

13. The system of claim 10, wherein the plurality of candidate user interfaces includes a default user interface that was previously provided to the plurality of users.

14. The system of claim 13, wherein the version test unit comprises:
a version analyzer configured for comparing each of the plurality of candidate user interfaces with the default user interface;
a user assignment unit configured for selecting a subset of users from the plurality of user for each of the plurality of candidate user interfaces based on the comparing; and
a version test generator configured for providing each of the plurality of candidate user interfaces to the subset of users.

15. The system of claim 10, further comprising:
a fitness function selector configured for determining a metric associated with a user interface; and
a fitness score calculator configured for calculating a score for each of the plurality of candidate user interfaces based on the inputs in accordance with the metric, wherein the one or more candidate user interfaces are selected from the plurality of candidate user interfaces based on their respective scores.

16. The system of claim 15, wherein the metric is related to at least one of:
revenue of a publisher associated with the identified user interface; and
user experience of the plurality of users with respect to a user interface.

17. The system of claim 10, wherein the new candidate user interface is generated by at least one of:
recombining the one or more parameters associated with the selected one or more candidate user interfaces;
modifying a value of a parameter within one of the selected one or more candidate user interfaces; and
modifying a value of a parameter after recombining the one or more parameters associated with the selected one or more candidate user interfaces.

18. A machine-readable tangible and non-transitory medium having information for providing a user interface to a plurality of users, wherein the information, when read by the machine, causes the machine to perform the following:
determining a plurality of candidate user interfaces each of which is associated with one or more parameters related to a user interface;

providing each of the plurality of candidate user interfaces to a subset of users selected from the plurality of users;

obtaining inputs from the plurality of users with respect to each of the plurality of candidate user interfaces;

selecting one or more candidate user interfaces from the plurality of candidate user interfaces based on the inputs;

generating a new candidate user interface based on the selected one or more candidate user interfaces;

identifying a user interface based on the new candidate user interface and the selected one or more candidate user interfaces; and providing the identified user interface to the plurality of users.

19. The medium of claim 18, wherein the determining comprises:

obtaining a plurality of parameters related to a user interface, wherein each of the plurality of parameters is associated with a predetermined range; and determining the plurality of candidate user interfaces each of which is associated with one or more parameters selected from the plurality of parameters, wherein each of the one or more parameters has a value within the predetermined range.

20. The medium of claim 18, wherein the one or more parameters include at least one of: foreground color, background color, line height, line space, font size, font style, and margin.

* * * * *